United States Patent [19]

Suzuyama et al.

[11] Patent Number: 5,134,542
[45] Date of Patent: Jul. 28, 1992

[54] THREE-PHASE PACKAGE-TYPE GAS-INSULATED SWITCH GEAR HAVING ISOLATORS BEING ALIGNED IN A FIRST PLANE AND EARTHING SWITCHES DISPOSED LATERALLY SIDE BY SIDE ON A SECOND PLANE

[75] Inventors: Hiroshi Suzuyama, Hitachiota; Minoru Sakaguchi; Osamu Mikami, both of Hitachi; Yoshirou Suzuki, Ibaraki, all of Japan

[73] Assignee: Hitachi, Ltd., Tokyo, Japan

[21] Appl. No.: 548,662

[22] Filed: Jul. 5, 1990

[30] Foreign Application Priority Data

Jul. 5, 1989 [JP] Japan .................................. 1-171819

[51] Int. Cl.⁵ .............................................. H02B 7/01
[52] U.S. Cl. ................................................. 361/335
[58] Field of Search ..................... 361/333, 335, 341; 307/147, 148; 200/148 D, 148 F

[56] References Cited

U.S. PATENT DOCUMENTS

| | | | |
|---|---|---|---|
| 3,780,354 | 12/1973 | Sharp | 361/335 |
| 4,827,088 | 5/1989 | Oakes et al. | 361/335 X |
| 5,003,427 | 3/1991 | Reichl et al. | 361/341 |

FOREIGN PATENT DOCUMENTS

| | | | |
|---|---|---|---|
| 2427445 | 5/1975 | Fed. Rep. of Germany | 361/335 |
| 56-116810 | 9/1981 | Japan. | |
| 60-62807 | 4/1984 | Japan. | |
| 61-170212 | 7/1986 | Japan. | |
| 2083951 | 3/1982 | United Kingdom | 361/335 |

Primary Examiner—Leo P. Picard
Assistant Examiner—Michael W. Phillips
Attorney, Agent, or Firm—Antonelli, Terry, Stout & Kraus

[57] ABSTRACT

A gas-insulated switchgear comprises a sealed enclosure filled with an electrically insulating gas, isolators of three phases for making/breaking a main circuit, and earthing switches of the three phases for grounding the main circuit. The isolators and the earthing switches are disposed in the sealed enclosure, with the isolator of each phase including oppositely disposed stationary and movable side contacts, and a movable contact for turning on or off electrical connection between them. The earthing switch of each phase includes an earth stationary contact connected to one of the movable side conductors and an earth movable contact for connection with or disconnection from the earth stationary contact. The components of the isolators of the three phases and the components of the earthing switches of the three phases are respectively situated on two virtual planes, which are adjacent to each other and disposed substantially along a longitudinal direction of the sealed enclosure.

7 Claims, 4 Drawing Sheets

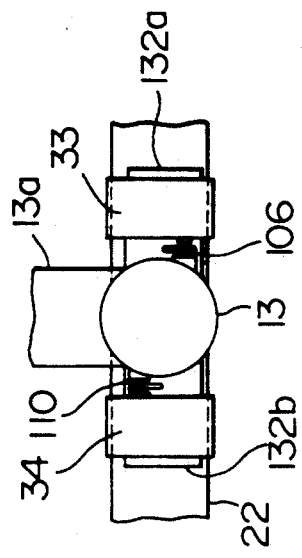
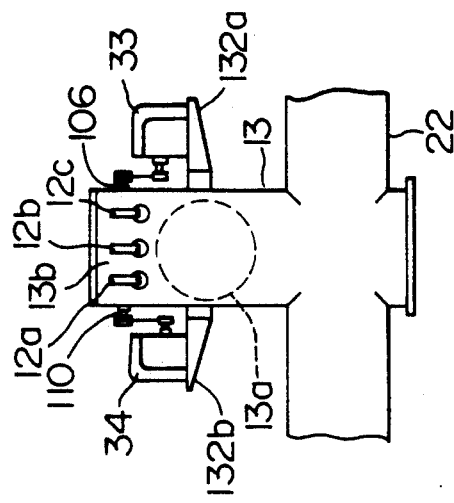
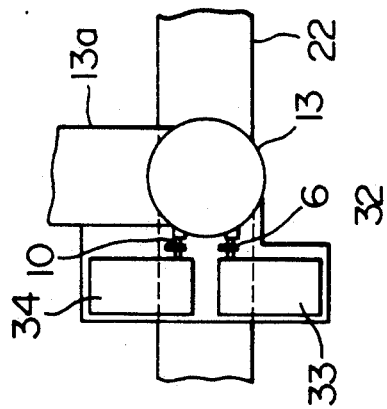
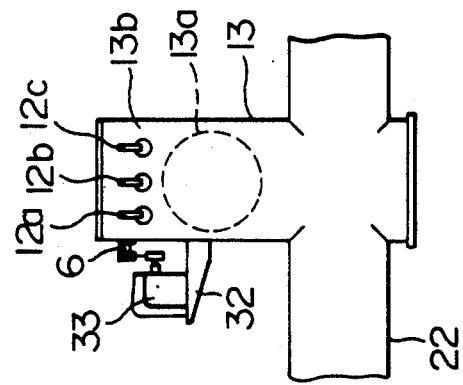

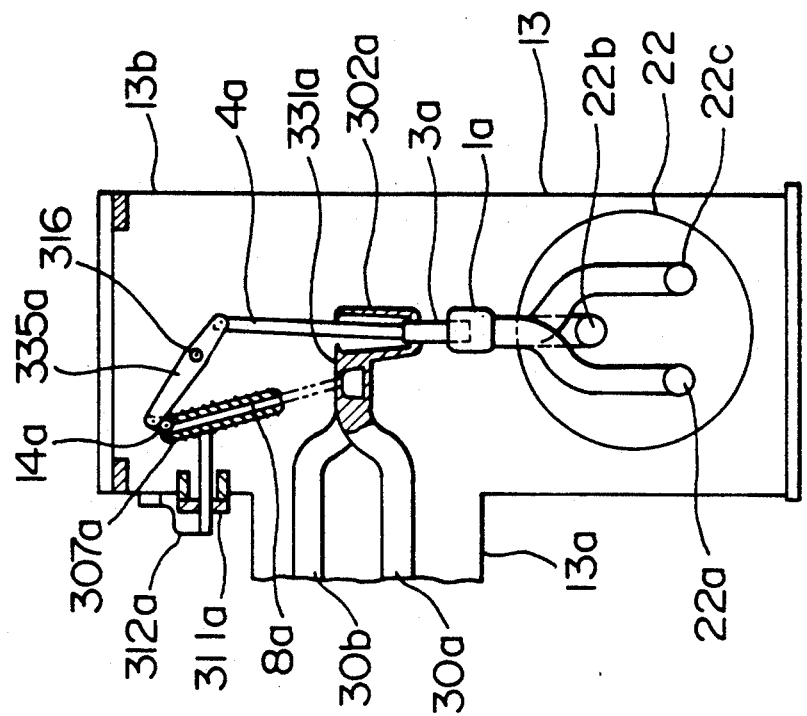
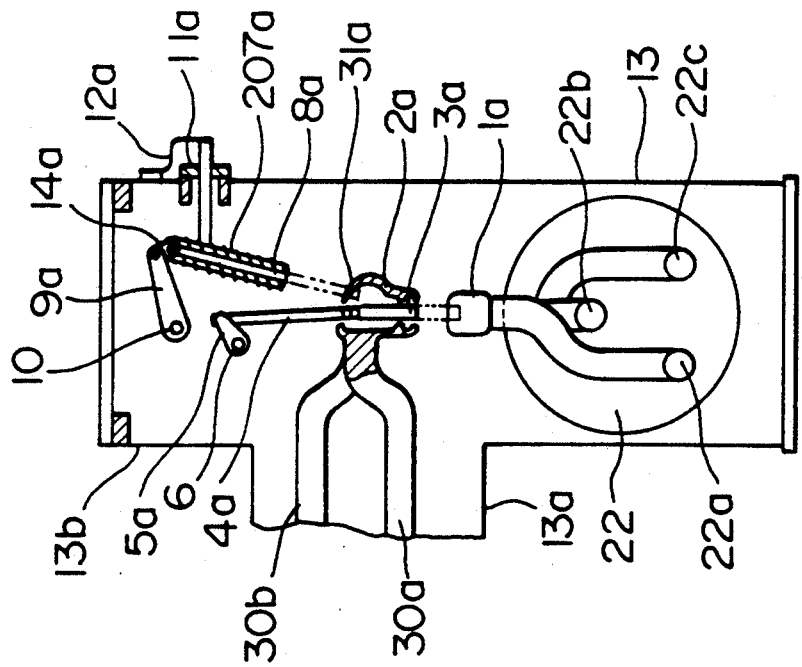

THREE-PHASE PACKAGE-TYPE GAS-INSULATED SWITCH GEAR HAVING ISOLATORS BEING ALIGNED IN A FIRST PLANE AND EARTHING SWITCHES DISPOSED LATERALLY SIDE BY SIDE ON A SECOND PLANE

BACKGROUND OF THE INVENTION

The present invention relates to a switchgear for use in, for example, a substation and, more particularly, to a three-phase common enclosure or a three-phase package type gas-insulated switchgear which has isolators and earthing switches of three phases accommodated within a common enclosure.

A typical gas-insulated switchgear has a relatively small volume while providing sufficient electric insulation. More specifically, in a typical gas-insulated switchgear, isolators for disconnecting electrical connections to circuits, earthing switches for grounding the circuits, and so on are housed within a hermetically sealed enclosure having an insulation gas such as sulfur hexafluoride (SF$_6$) gas or the like having excellent electrical insulation property filled therein. A gas-insulated switchgear of such construction is widely used at high-voltage class substations situated in urban areas so as to enable a reduction in a size of the installation sites.

In, for example, Japanese utility model unexamined publication no. 56-116810, two rod-like movable contact elements of an isolator and an earthing switch are disposed substantially in parallel with each other and, for reducing a length of an enclosure of the switchgear, Japanese patent unexamined publication no. 60-62807 proposes disposing driving portions of isolators and earthing switches within a radially extending cylindrical space formed in the enclosure.

In, for example, Japanese patent unexamined publication no. 61-170212, isolators and earthing switches of three phases are mounted on a bracket and fixed, as an integrated body, within an enclosure, with the isolators and earthing switches being disposed and extending in a direction transversely of a longitudinal direction of the enclosure.

SUMMARY OF THE INVENTION

It is an object of the present invention to provide a three-phase package-type gas-insulated switchgear having a reduced size so as to require a relatively small installation site and which provides sufficient insulation and permits easy access for maintenance of the switchgear.

In a gas-insulated switchgear according to the present invention, a sealed enclosure has a main bus bar disposed at one end thereof, with isolators for three phases and earthing switches for the three phases being provided in the sealed enclosure. The isolators and the earthing switches of the respective phases respectively extend substantially in a longitudinal direction of the sealed enclosure and the isolators for the three phases are disposed laterally side by side in alignment with one another on a virtual plane. The earthing switches for the three phases are disposed laterally side by side in alignment with one another on another virtual plane, and the isolators for the three phases and the earthing switches for the three phases are set at another end of the sealed enclosure opposite to the main bus bar.

Preferably, the two virtual planes are disposed within the sealing enclosure substantially in parallel to each other and at a slight distance therefrom.

Setting these virtual planes adjacent to each other, the isolators and the earthing switches of the three phases can be arranged at one end of the sealed enclosure. Accordingly, a shape of the sealed enclosure can be simplified as compared with conventional switchgears which provided exclusive spaces for respective isolators and the earthing switches, and the sealed enclosure of the present invention has a reduced size by virtue of the effective utilization of the inner space of the enclosure. Thus, equipment normally associated with the switchgear may be placed nearer to the switchgear, so that the entire installation site of the three-phase package-type gas-insulated switchgear and associated equipment can be reduced.

BRIEF DESCRIPTION OF THE DRAWINGS

The above and other objects, features and advantages of the present invention will become more apparent from the detailed description hereinbelow with reference to the accompanying drawings, wherein:

FIG. 3 is a plan view of the switchgear of FIG. 1;

FIG. 4 is a side view of the switchgear of FIG. 1;

FIG. 5 is a plan view of a switchgear constructed in accordance with another embodiment of the present invention;

FIG. 6 is a side view of the switchgear of FIG. 5;

FIG. 7 is a longitudinal cross-sectional view of a portion of a three-phase package-type gas-insulated switchgear according to a further embodiment of the invention;

FIG. 8 is a longitudinal cross-sectional view of a portion of a three-phase package-type gas-insulated switchgear according to yet another embodiment of the invention;

DESCRIPTION OF PREFERRED EMBODIMENTS

Figure 10:
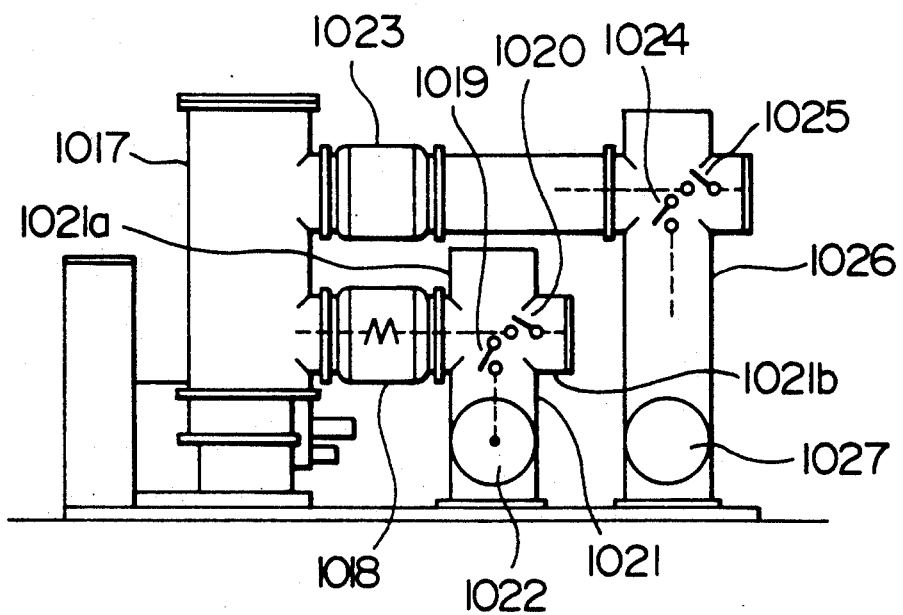
FIG. 10 is a front view of an entire conventional gas-insulated switchgear.

Referring now to the drawings, a conventional three-phase package-type gas-insulated switchgear, as shown in FIG. 10, includes two cross-shaped hermetically sealed enclosures 1021 and 1026, with each sealed enclosure, filled with an insulating gas, being connected at a lower end thereof to a main bus bar 1022 or 1027, and at one side thereof (the left side as viewed in FIG. 10) to a circuit breaker 1017 via a coupling duct 1018 or 1023. One sealed enclosure 1021 accommodates an isolator 1019 and an earthing switch 1020, which are electrically connected with the circuit breaker 1017 and the main bus bar 1022. The isolator 1019 is disposed within an upper end 1021a of the sealed enclosure 1021 and is adapted to be turned on or off by an operating device (not shown) provided in a vicinity of the upper end 1021a, with the earthing switch 1020 being located at another side 1021b (the right side as viewed in FIG. 10) of the sealed enclosure 1021 and being adapted to be turned on or off by another operating device (not shown) provided in the vicinity of the upper end 1021b. The other sealed enclosure 1026 is connected with the circuit breaker 1017 through a coupling duct 1023. An isolator 1024 and an earthing switch 1025 are disposed in the sealed enclosure 1026 and interposed between the circuit breaker 1017 and the main bus bar 1027 to be electrically connected thereto.

With the above-mentioned conventional arrangement, it is necessary to provide a sufficient space between the sealed enclosures 1021 and 1026 for enabling, for example, inspection of the earthing switch operating device disposed in the vicinity of the side portion of the sealed enclosure. This space results in increasing a size of the installation area for the entire gas-insulated switchgear. When both the isolator 1019 and the earthing switch 1020 and both the isolator 1024 and the earthing switch 1025 are housed within a common sealed enclosure so as to form a combined arrangement, the enclosure has a large width with respect to a direction in which the main bus bars 1022 and 1027 are arranged thereby increasing the size of the installation site.

A disadvantage of the conventional switchgear resides in the fact that, although the isolator and the earthing switch are disposed within the common enclosure to form the combined arrangement, the exclusive portions respectively provided for accommodating the isolator and the earthing switch complicate the shape of the enclosure and increase the size thereof.

Figure 1:
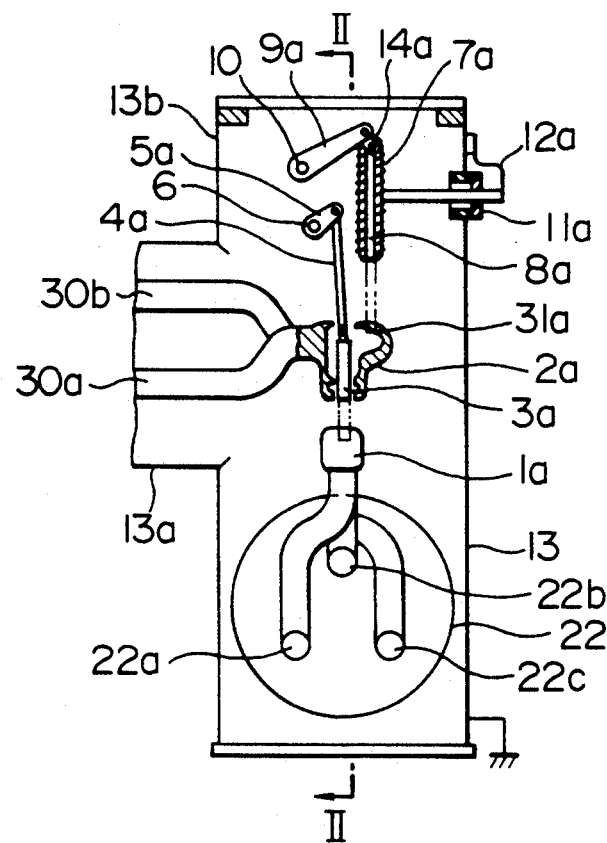
FIG. 1 is a longitudinal partial cross-sectional view of a portion of a three-phase package-type gas-insulated switchgear according to the present invention.
Figure 2:
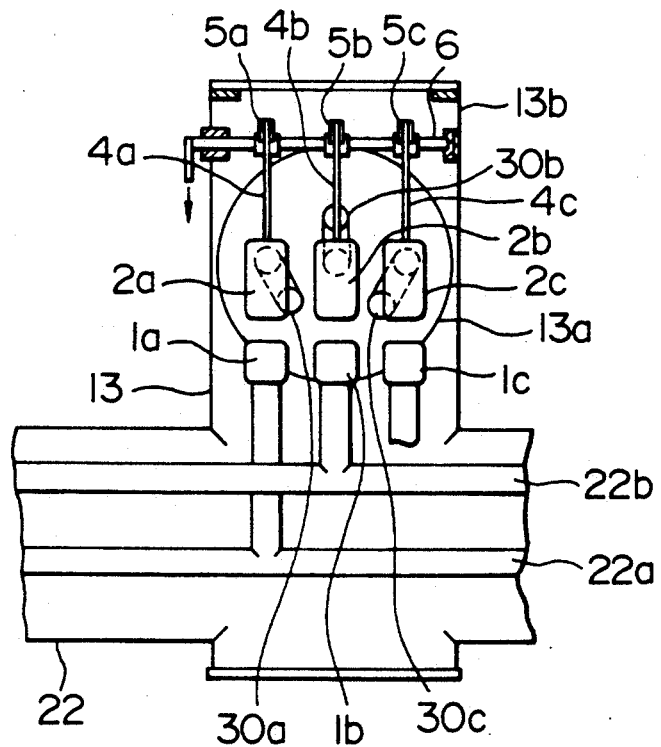
FIG. 2 is a cross-sectional view taken along the line II—II in FIG. 1.

In accordance with the present invention, as shown in FIG. 1, a three-phase package-type gas-insulated switchgear includes a sealed enclosure, filled with an insulating gas, connected, at a portion thereof adjacent an insulation surface, to a main bus bar 22, and arranged substantially perpendicular to the main bus bar 22. The main bus bar 22 includes bus bar conductors 22a, 22b and 22c of three phases. The sealed enclosure is provided, at a substantially intermediate position thereof, with a branch duct 13a through which connecting conductors 30a, 30b and 30c (FIG. 2) are connected to a circuit breaker or the like (not shown). Accordingly, with the main bus bar 22 removed, the sealed enclosure has a generally T-shaped configuration. The upper end 13b of the enclosure has a space where main circuit conductors, such as connecting conductors, are not located. On the other hand, the sealed enclosure 13 is a generally inverted T-shape as shown in FIG. 2, when viewed in a longitudinal direction of the branch duct 13a.

Within the thus-shaped sealed enclosure 13, three-phase isolators and earthing switches are provided. FIG. 1 illustratively shows the isolator and the earthing switch of only one phase. The isolators and the earthing switches will now be explained below.

Each isolator includes a movable side conductor, a stationary contact provided opposite to the conductor, and a movable contact for bridging between the movable side conductor and the stationary contact. As shown in FIG. 2, the three phase movable side conductors 2a, 2b, 2c are respectively connected to ends of the connecting conductors 30a, 30b, 30c in the branch duct 13a. The movable side conductors 2a, 2b, 2c are arranged substantially horizontally side by side along the main bus bar 22. The stationary contacts 1a, 1b, 1c, made of a material having conductivity, are adapted to respectively be connected to the bus bar conductors 22a, 22b, 22c. These stationary contacts are provided opposite to the respective movable side conductors 2a, 2b, 2c to be arranged horizontally side by side. Each movable side conductor 2a, 2b, 2c is formed in a tulip-like shape with a through-hole for slidably receiving the elongated movable contact of a conductive material. Meanwhile, the lower end of each movable side conductor 2a, 2b, 2c is adapted to always contact an associated movable contact with an elastic force, thereby ensuring a reliable electrical connection between them. The movable contacts of the three phases are disposed horizontally side by side, but in FIG. 1, only one of the movable contacts is illustrated and denoted by the reference numeral 3a.

The respective movable contacts are connected to a common operating shaft 6 for the isolators through operating rods 4a, 4b, 4c and operating levers 5a, 5b and 5c, with both the rods 4a, 4b, 4c and the levers 5a, 5b, 5c being located in the upper end 13b of the sealed enclosure 13. As shown in FIG. 2, the operating shaft 6 extends substantially horizontally in the sealed enclosure 13. Accordingly, the movable side conductors 2a to 2c, the stationary contacts 1a to 1c and the movable contacts 3a to 3c which respectively constitute the isolators, lie side by side on lines which extend substantially parallel to the operating shaft 6. Further, the isolators of the three phases are located on a substantially vertical plane along the main bus bar. The isolators are not disposed in the same manner as the main bus bar in the conventional three-phase package switchgear of FIG. 10.

One end of the isolator-operating shaft 6 extends out of the hermetically sealed enclosure 13, and is connected to an operating device 33 as shown in FIG. 3. Each movable contact is vertically moved by the operating device while being maintained in contact with the associated movable side conductor, so that the electrical connections between the bus bar conductors 22a, 22b, 22c and the connecting conductors are established when the movable contacts come into contact with the respective stationary contacts 1a, 1b, 1c.

The earthing switch includes an earth stationary contact 31a and an elongated earth movable contact 8a provided opposite to the earth stationary contact 31a. The earth stationary contact 31a is formed on a portion of the movable side conductor 2a of the isolator. The earthing switch movable contact 8a is made of a conductive material, and the upper end thereof is connected through an electrical insulator 14a to one end of an operating lever 9a, with the other end of the operating lever 9a being connected to an operating shaft 10 for the earthing switches. The operating shaft 10 extends in parallel to the isolator operating shaft 6, with the operating shaft 10 being common to the earthing switches of the three phases, and operating levers of the earthing switches of two other phases (not shown) are also connected to this operating shaft.

The earthing switch movable contact 8a is slidably guided within a movable side cylindrical conductor 7a to be constantly maintained in electrical contact with the movable side conductor 7a. The movable side conductor 7a extends substantially parallel to the movable contacts of the isolators, and the movable side conductor 7a is led to the outside of the sealed enclosure 13 through an electric insulator 11a under an electrically insulated condition, and then grounded through an earthing conductor 12a and the sealed enclosure 13. When the earth movable contact 8a contacts the earth stationary contact 31a by operation of the lever 9a, at least the connecting conductor 30a is grounded.

The earthing switches for the two other phases, not shown in the drawings, are of the same construction and material as the earthing switch described above. Accordingly, the components of the three phases, or the earth movable contacts and the stationary contacts are respectively arranged side by side along lines which are substantially parallel to the operating shaft 10. Further, the components of the three-phase earthing switches are disposed on a substantially vertical plane along the main bus bars. The plane in which the earthing switches are disposed is substantially parallel to the plane in which the isolators are disposed.

The operating shaft 10 extends out of the sealed enclosure 13 and is connected with an operating device 34.

In the three-phase package-type gas-insulated switchgear of the present invention, the movable side conductor, the movable contact and the stationary contact of each phase isolator are aligned with one another in a longitudinal direction of the sealed enclosure 13 and, at the same time, the movable side conductors of the three phases, as well as the movable contacts and the stationary contacts, are arranged side by side in a transverse direction of the sealed enclosure 13. The earthing switch stationary contact and the earthing switch movable contact of each phase are aligned with each other in a longitudinal direction of the sealed enclosure, and the earth switch stationary contacts and the earth switch movable contacts of the three phases are respectively arranged side by side in a transverse direction of the sealed enclosure 13. In other words, the isolators and the earthing switches of the three phases are respectively arranged on two substantially vertical planes within the sealed enclosure 13. Furthermore, the components, for example, all movable contacts, are disposed in alignment along lines which extend parallel to the operating shafts 16 and 10. By virtue of the disposition of the components in accordance with the present invention, the isolators and the earthing switches can be housed within a relatively small space, and, in the illustrated embodiment, within the upper end of the enclosure 13b. Thus, the sealed enclosure 13 is relatively simple in construction and has a relatively small size as compared with the conventional type enclosures.

As shown in FIGS. 3 and 4, an attachment base 32 is fixed on a side of the sealed enclosure 13, with an operating device 33 for the isolators and the operating device 34 being mounted on the base 32. The operating device 33 is connected to the end of the operating shaft 6 for the isolators, and the operating device 34 is connected to the end of the operating shaft 10 for the earthing switches. Reference numerals 12b and 12c in FIG. 4 denote earthing switch conductors similar to the earthing switch conductor 12a.

A three-phase package-type gas-insulated switchgear according to the embodiment of FIGS. 3 and 4 is substantially similar to that of the first embodiment except the portions relating to the disposition of the operating devices for isolators and earthing switches. In the embodiment of FIGS. 3 and 4, operating shafts 106, 110 for the isolators and earthing switches respectively extend out of the sealed enclosure 13 in opposite directions. Attachment bases 132a, 132b are fixed on both sides of the sealed enclosure 13 in the same manner as the first embodiment, and the operating devices 33, 34 are respectively mounted on the attachment bases 132a, 132b. An end of the respective operating shafts 106, 110 is connected to the operating devices 33, 34 and, preferably, the operating shafts 106, 110 are disposed substantially in parallel to the axis of the main bus bar 22 connected substantially at a right angle to the lower portion of the sealed enclosure 13. By arranging the operating devices 33, 34, connected to the operating shafts 106, 110, above the main bus bar 22 at opposite positions to each other, it is possible to avoid an increase in a size of the installation site for the three-phase package-type gas-insulated switchgear.

The embodiment of FIG. 7 differs from the switchgear of the first embodiment only in that one of the virtual disposition planes for the isolators and the earthing switches in the embodiment of FIG. 7 is inclined, whereas, the virtual disposition planes in the first embodiment are parallel to each other.

Referring to FIG. 7, a movable side conductor 207a of one earthing switch, illustrated as a representative, is supported by the sealed enclosure 13 through the electrical insulator 11a in an inclined position with respect to the longitudinal direction of the sealed enclosures 13. The movable contact 8a moves in a direction along the axis of the conductor 207a, and the earth switch stationary contact 31a is also provided along an extension of an axis of the conductor 207a. The earthing switches for the remaining two phases have the same construction. Thus, the earthing switches for the three phases are disposed on a plane which extends through the axis of the respective movable conductors. Further, the components of the earthing switches for the three phases, i.e., earth movable contacts or earth stationary contacts, are respectively aligned on lines which are substantially parallel to the operating shaft 10.

In this manner, the disposition planes for the isolators and the earthing switches may be arranged parallel and adjacent to each other as in the first embodiment, or may be arranged so that at least one of the disposition planes is inclined with respect to a longitudinal direction of the sealed enclosure, to make a distance between two virtual planes at movable contacts 3a, 3c larger than a distance between the same virtual planes on a side of the stationary contacts 1a-1c as in the embodiment of FIGS. 3 and 4. By virtue of this construction, a larger insulation distance as compared with that in the first embodiment can be ensured between the movable side conductor 207a and the operating rod 4a of the isolator. Accordingly, the effect of preventing deterioration in the electrical insulation is enhanced, with such deterioration occurring when the earthing switch, disposed in the upper side of the sealed enclosure, disturbs an electrical insulation of the operating rod 4a.

In FIG. 8, considering the operational relationship between the isolators and the earthing switches, each earthing switch is operated to ground after the isolator has broken the electrical connection between the main bus bar conductor and the connection contact, while each isolator connects the main bus bar conductor and the connection conductor after the associated earthing switch has broken the connection to the ground.

In view of the above, the embodiment of FIG. 8 provides a construction wherein the isolators and the earthing switches are driven by a single operation device to carry out the above operation. The movable contact 3a of the isolator and the earth movable contact 8a of the earthing switch, both illustrated as representatives, are connected to a common operating shaft 316. A single operation lever 335a is connected at its intermediate portion to the operating shaft 316. One end of the operating lever 335a is connected to the movable contact 3a of the isolator through the operating rod 4a having electrical insulatability, with the other end of the operating lever 335a being connected to the earthing switch movable contact 8a through the insulator 14a.

A movable side conductor 307a of the earthing switch is located on the side nearest to the connecting conductors 30a to 30c within the sealed enclosure 13, with the movable side conductor 307a being arranged at an inclination similarly to the embodiment of FIG. 7. By virtue of the inclined disposition of the movable side conductor 307a, an electrical insulator 311a and an earthing switch conductor 312a, which correspond to the electrical insulator 11a and the earthing switch conductor 12a, are provided on a side adjacent to the enclosure 13. Further, an earthing switch stationary contact 331a is also provided in a vicinity of the connecting conductors 30a–30c.

In the embodiment of FIG. 8, the movable side conductor 302a, the movable contact 3a and the stationary contact 1a of the isolator are located on one common plane, and the conductor 307a, the movable contact 8a and the stationary contact 331a of the earthing switch are located on an inclined plane. The same components of the isolators and the earthing switches for the three phases are aligned along lines which are substantially parallel to the operating shaft 316. Also, in the embodiment of FIG. 8, the upper end of the sealed enclosure 13b, where no circuit conductor is located, is utilized to accommodate the isolators and the earthing switches.

Figure 9:
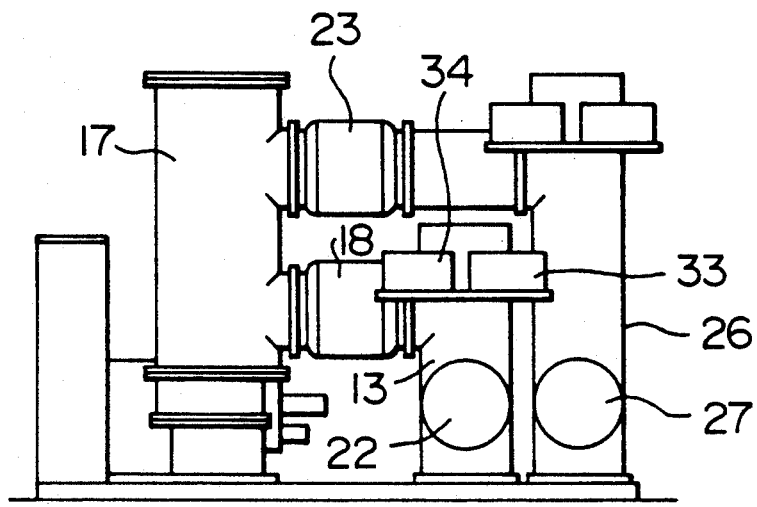
FIG. 9 is a front view of the entire gas-insulated switchgear of FIG. 1.

As shown in FIG. 9, the switchgear according to the invention includes two sealed enclosures 13, 26 to which the main bus bars 22, 27 are respectively connected, with the sealed enclosures 13, 26 being connected to a circuit breaker 17 via connecting ducts 18, 23 in a manner similar to the conventional switchgear. The operating devices 33, 34 for the isolators and the earthing switches of the embodiment of FIG. 9 are situated to one side of the sealed enclosure above the main bus bar and differs from the conventional switch gear of FIG. 10 wherein the operating devices are interposed between the sealed enclosures. Further, as in the embodiment of FIGS. 5 and 6, the two sealed enclosures can be located near each other since both the operating devices are situated above the main bus bar, thereby decreasing the size of the entire three-phase package-type gas-insulated switchgear.

Although the sealed enclosure 13 has been described as being provided with the main bus bar 22 at the lower end thereof and with the branch duct 13a at its side, the sealed enclosure 13 may be provided with another branch duct opposite to the branch duct 13a or may be connected to a connection bus bar of the main bus bar 22. Further, the sealed enclosures 13 may be installed horizontally or upside down. In any case, it is enough for the sealed enclosure to have an end portion in which no main bus bar is located.

What is claimed is:

1. A three-phase package-type gas insulating switchgear comprising:
    a sealed enclosure having an insulating gas accommodated therein and including a main bus bar disposed on one end thereof;
    isolators for three phases provided in said sealed enclosure; and
    earthing switches for the three phases provided within said sealed enclosure; and
    wherein said isolators and said earthing switches of the respective phases extend substantially in a longitudinal direction of said sealed enclosure, said isolators of the three phases being disposed laterally side by side in alignment with one another on a plane, said earthing switches of the three phases being disposed laterally side by side in alignment with one another on another plane, said isolators and said earthing switches being disposed at an end of said sealed enclosure opposite to said main bus bar,
    wherein each of said isolators includes a movable side conductor and a stationary contact disposed in opposition to the movable side conductor, and a movable contact for turning on and off an electrical connection between said movable side conductor and said stationary contact, and wherein each of said earthing switches includes an earth stationary contact connected with one of said movable side conductors and an earth movable contact provided opposite to said earth stationary contact for connection and disconnection therewith,
    wherein said movable side conductor, said movable contact and said stationary contact of the isolator for each phase are aligned with one another in a longitudinal direction of said sealed enclosure, said movable side conductors, said movable contacts and said stationary contacts for the three phases are respectively arranged side by side in transverse directions of said sealed enclosure, said earth stationary contact and said earth movable contact of the earthing switch of each phase are aligned with each other in a longitudinal direction of said sealed enclosure, and said earth stationary contacts and said earth movable contacts of the three phases are respectively arranged side by side in transverse directions of said sealed enclosure,
    wherein said movable side conductors, said movable contacts and said stationary contacts of the three phases are respectively arranged along three parallel lines extending in transverse directions of said sealed enclosure, and said earth stationary contacts and said earth movable contacts of the three phases are respectively arranged along two parallel lines extending in transverse directions of said sealed enclosure.

2. The switchgear according to claim 1, wherein an operating shaft for the isolators and another operating shaft for the earthing switches are provided at an operating side from said stationary contacts with respect to said movable side conductors, both said operating shafts are in parallel to each other within said sealed enclosure, all of said movable contacts of the isolators for the three phases are operatively connected with said operating shaft for the isolators, all of said earth movable contacts for the three phases are operatively connected with said operating shaft for the earthing switches, and said lines are respectively substantially parallel to both of said operating shafts.

3. The switchgear according to claim 2, wherein said main bus bar is connected substantially perpendicularly to the one end of said sealed enclosure, ends of said two operating shafts protrude out of one side of said sealed enclosure, and wherein said ends of said operating shaft are respectively operatively connected with two operating devices disposed above said main bus bar.

4. The switchgear according to claim 2, wherein said main bus bar is connected substantially perpendicularly to the one end of said sealed enclosure, ends of said two operating shafts respectively protrude out of opposite sides of the sealed enclosure, and wherein said ends of said operating shafts are respectively operatively connected with two operating devices disposed above said main bus bar on both sides of said sealed enclosure.

5. The switchgear according to claim 1, wherein a single operating shaft for the isolators and the earthing switches is provided at an opposite side from said stationary contacts with respect to said movable side conductors, said single operating shaft is disposed within said sealed enclosure, all of said movable contacts for the three phases and said earth movable contacts for the three phases are operatively connected with said single operating shaft and said five lines are respectively parallel to said operating shaft.

6. The switchgear according to claim 1, wherein said two planes are parallel to and adjacent to each other.

7. A three-phase package-type gas insulating switchgear comprising:
- a sealed enclosure having an insulating gas accommodated therein and including a main bus bar disposed on one end thereof;
- isolators for three phases provided in said sealed enclosure; and
- earthing switches for the three phases provided within said sealed enclosure; and
- wherein said isolators and said earthing switches of the respective phases extend substantially in a longitudinal direction of said sealed enclosure, said isolators of the three phases being disposed laterally side by side in alignment with one another on a plane, said earthing switches of the three phases being disposed laterally side by side in alignment with one another on another plane, said isolators and said earthing switches being disposed at an end of said sealed enclosure opposite to said main bus bar,
- wherein said two planes are adjacent to each other, and at least one of said planes is inclined with respect to a longitudinal direction of said sealed enclosure so that a distance between said planes on a side of a movable contact is larger than a distance between said planes on a side of the stationary contact.

* * * * *